United States Patent
Zhang et al.

(10) Patent No.: US 12,444,328 B2
(45) Date of Patent: Oct. 14, 2025

(54) DETACHMENT DEVICE FOR SPLICED DISPLAY DEVICE AND DETACHING METHOD THEREOF

(71) Applicants: BOE MLED Technology Co., Ltd., Beijing (CN); BOE Technology Group Co., Ltd., Beijing (CN)

(72) Inventors: Wei Zhang, Beijing (CN); Pengju Hu, Beijing (CN); Yang Yu, Beijing (CN); Zhenguo Li, Beijing (CN); Pengwei Wang, Beijing (CN); Junchao Lu, Beijing (CN)

(73) Assignees: BOE MLED Technology Co., Ltd., Beijing (CN); Beijing BOE Technology Development Co., Ltd., Beijing (CN)

( * ) Notice: Subject to any disclaimer, the term of this patent is extended or adjusted under 35 U.S.C. 154(b) by 0 days.

(21) Appl. No.: 18/557,928

(22) PCT Filed: Nov. 21, 2022

(86) PCT No.: PCT/CN2022/133215
§ 371 (c)(1),
(2) Date: Oct. 28, 2023

(87) PCT Pub. No.: WO2024/108330
PCT Pub. Date: May 30, 2024

(65) Prior Publication Data
US 2025/0087121 A1     Mar. 13, 2025

(51) Int. Cl.
*G06F 1/16*     (2006.01)
*F16M 11/04*    (2006.01)
(Continued)

(52) U.S. Cl.
CPC ......... *G09F 9/3026* (2013.01); *F16M 11/045* (2013.01); *F16M 11/046* (2013.01)

(58) Field of Classification Search
CPC ...... G09F 9/3026; G09F 9/3023; G09F 9/302; G09F 9/30; F16M 11/045; F16M 11/046; F16M 11/048; F16M 11/043; F16M 11/04
See application file for complete search history.

(56) References Cited

U.S. PATENT DOCUMENTS 5,816,672 A  * 10/1998  LaPointe .............. G11B 33/127
                                                     312/219
9,392,723 B2 *  7/2016  Bailey ................ H05K 7/20709
(Continued)

FOREIGN PATENT DOCUMENTS

CN     101546503 A     9/2009
CN     111899656 A    11/2020
(Continued)

*Primary Examiner* — Anthony M Haughton
(74) *Attorney, Agent, or Firm* — Ling Wu; Stephen Yang; Ling and Yang Intellectual Property

(57) ABSTRACT

An detachment device for a spliced display device includes: a detachment mechanism disposed to be connected with the first display unit to drive the first display unit to move along a direction away from or close to a plane where the spliced display device is located; at least one moving device, wherein the moving device includes a moving frame located outside the detachment mechanism and an adjustment member disposed on the moving frame, the moving frame is connected with the second display unit, the adjustment member abuts against the detachment mechanism, and the moving frame drives the second display unit connected with the moving frame to move in a direction away from the first display unit through the adjustment member on the plane where the spliced display device is located.

20 Claims, 4 Drawing Sheets

(51) Int. Cl.
*G09F 9/302* (2006.01)
*H05K 5/00* (2025.01)
*H05K 7/00* (2006.01)

(56) References Cited

U.S. PATENT DOCUMENTS

| | | | |
|---|---|---|---|
| 9,684,806 B2* | 6/2017 | Bailey | G06F 21/86 |
| 9,693,464 B2* | 6/2017 | Bailey | H05K 3/306 |
| 11,416,446 B2* | 8/2022 | Sharma | G06F 16/1734 |
| 2013/0194726 A1* | 8/2013 | Bailey | H05K 7/1489 |
| | | | 361/637 |
| 2013/0198532 A1* | 8/2013 | Bailey | H02B 1/26 |
| | | | 361/752 |
| 2015/0181750 A1* | 6/2015 | Bailey | H05K 7/20736 |
| | | | 361/679.48 |
| 2015/0181752 A1* | 6/2015 | Bailey | G06F 21/86 |
| | | | 312/236 |
| 2022/0007525 A1 | 1/2022 | Zhang et al. | |
| 2022/0121619 A1* | 4/2022 | Sharma | G06F 16/122 |

FOREIGN PATENT DOCUMENTS

| | | |
|---|---|---|
| CN | 212516404 U | 2/2021 |
| CN | 214068202 U | 8/2021 |
| CN | 216249838 U | 4/2022 |

* cited by examiner

DETACHMENT DEVICE FOR SPLICED DISPLAY DEVICE AND DETACHING METHOD THEREOF

CROSS-REFERENCE TO RELATED APPLICATION

This application is a national stage application of PCT Application No. PCT/CN2022/133215, which is filed on Nov. 21, 2022, and entitled "Detachment Device for Spliced Display Device and Detaching Method Thereof", the content of which should be regarded as being incorporated herein by reference.

TECHNICAL FIELD

The present disclosure relates to, but is not limited to, the technical field of display, in particular to a detachment device for a spliced display device and a detaching method thereof.

BACKGROUND

With the development of science and technology, spliced display devices are widely used. Spliced display devices are usually composed of several independent display units, and there is a splicing gap between adjacent display units.

As the splicing gap of the spliced display device is getting smaller and smaller, when the display unit in the middle part of the spliced display device is defective and needs to be replaced, in order to prevent the occurrence of defective operations such as rubbing on the normal display unit around the defective display unit during the process of detaching the defective display unit, it is necessary to start detaching the display unit at the edge of the spliced display device until it is detached to the position of the defective display unit, resulting in waste of operation, and a large quantity of detaching processes may also cause new defective operations.

SUMMARY

The following is a summary of subject matter described herein in detail. The summary is not intended to limit the protection scope of claims.

In one aspect, the present disclosure provides a detachment device for a spliced display device, the spliced display device includes a first display unit and a second display unit adjacent to the first display unit, the first display unit and the second display unit are spliced with each other; the detachment device for spliced display device includes:
  a detachment mechanism disposed to be connected with the first display unit to drive the first display unit to move along a direction away from or close to a plane where the spliced display device is located;
  at least one moving device, wherein the moving device includes a moving frame located outside the detachment mechanism and an adjustment member disposed on the moving frame, the moving frame is connected with the second display unit, the adjustment member abuts against the detachment mechanism, and on the plane where the spliced display device is located, the moving frame drives the second display unit connected with the first moving device to move along a direction away from the first display unit through the adjustment member.

In an exemplary embodiment, the detachment device includes a first moving device located on opposite sides of the detachment mechanism in a first direction and a second moving device located on opposite sides of the detachment mechanism in a second direction, the first moving device and the second moving device are respectively connected with different second display units, the first moving device drives the second display unit connected with the first moving device to move along the first direction, the second moving device drives the second display unit connected with the second moving device to move along the second direction, the first direction intersects the second direction, and both the first direction and the second direction are parallel to the plane where the spliced display device is located.

In an exemplary embodiment, the moving device further includes a support post disposed on the moving frame, and the support post is connected with the second display unit.

In the exemplary embodiment, the moving device further includes a guide rail disposed on the moving frame, the guide rail is slidably connected with the moving frame and fixedly connected with the detachment mechanism.

In an exemplary embodiment, the moving device further includes a fastener disposed on the moving frame, the fastener is fastened and connected with a first end of the detachment mechanism, and the adjustment member abuts against a second end of the detachment mechanism.

In an exemplary embodiment, the adjustment member is a micrometer head structure.

In an exemplary embodiment, the detachment mechanism includes a fixing frame, a guide post disposed on the fixing frame, and a detachment member slidably connected with the guide post, the adjustment member abuts against the fixing frame, the guide post extends along a third direction intersecting with the plane where the spliced display device is located, the detachment member is slidably connected with the guide post, and the detachment member includes a connecting post disposed to be connected with the first display unit.

In an exemplary embodiment, the detachment mechanism further includes a first alignment device and a second alignment device disposed at intervals on the fixing frame, the first alignment device is aligned with a first corner position of the first display unit, and the second alignment device is aligned with a second corner position of the first display unit.

In an exemplary embodiment, the detachment member further includes a bearing substrate that is slidably connected with the guide post, and the connecting post is disposed on the bearing substrate.

In an exemplary embodiment, the detachment member further includes a handle disposed on a side of the bearing substrate away from the connecting post.

In another aspect, the present disclosure also provides a detaching method of a detachment device for a spliced display device as described in any one of the embodiments, including:
  connecting the detachment mechanism with the first display unit, and connecting the moving frame of the moving device with the second display unit, so that the adjustment member of the moving device abuts against the detachment mechanism;
  on the plane where the spliced display device is located, driving, by the moving frame, the second display unit connected with the moving frame to move along a direction away from the first display unit through the adjustment member, so that a splicing gap between the second display unit and the first display unit reaches a predetermined value;

driving, by the detachment mechanism, the first display unit to move along the direction away from the spliced display device, so that the first display unit and the second display unit are detached and separated.

Other aspects may become clear after the accompanying drawings and the detailed description are read and understood.

BRIEF DESCRIPTION OF DRAWINGS

Accompanying drawings are used for providing an understanding for technical solutions of the present application and form a part of the specification, are used for explaining the technical solutions of the present application together with embodiments of the present application, and do not constitute a limitation on the technical solutions of the present application.

DETAILED DESCRIPTION

Figure 1:
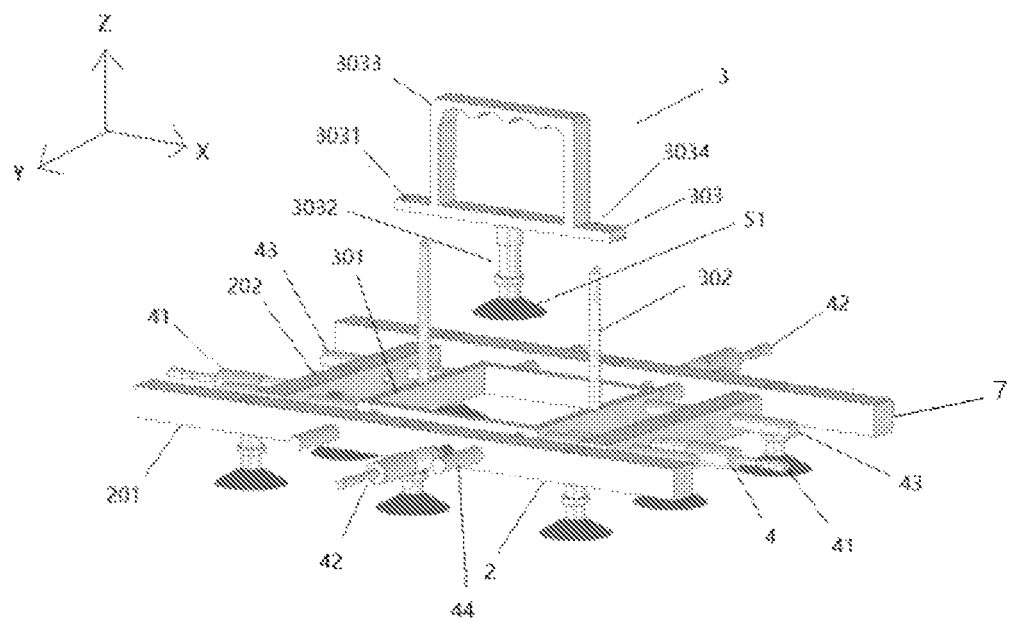
FIG. 1 is a perspective view of a detachment device for a spliced display device according to an exemplary embodiment of the present disclosure.

To make objectives, technical solutions, and advantages of the present disclosure clearer, the embodiments of the present disclosure will be described in detail with reference to the accompanying drawings. It is to be noted that implementations may be practiced in a plurality of different forms. Those of ordinary skills in the art may easily understand such a fact that implementations and contents may be transformed into various forms without departing from the purpose and scope of the present disclosure. Therefore, the present disclosure should not be explained as being limited to contents described in following implementations only. The embodiments in the present disclosure and features in the embodiments may be combined randomly with each other if there is no conflict.

In the drawings, a size of a constituent element, a thickness of a layer, or a region is exaggerated sometimes for clarity. Therefore, one implementation of the present disclosure is not necessarily limited to the sizes, and shapes and sizes of various components in the drawings do not reflect actual scales. In addition, the drawings schematically illustrate ideal examples, and one implementation of the present disclosure is not limited to shapes, numerical values, or the like shown in the drawings.

Ordinal numerals such as "first", "second", and "third" in the specification are set to avoid confusion between constituent elements, but not to set a limit in quantity.

In the specification, for convenience, wordings indicating orientation or positional relationships, such as "middle", "upper", "lower", "front", "back", "vertical", "horizontal", "top", "bottom", "inside", and "outside", are used for illustrating positional relationships between constituent elements with reference to the drawings, and are merely for facilitating the description of the specification and simplifying the description, rather than indicating or implying that a referred device or element must have a particular orientation and be constructed and operated in the particular orientation. Therefore, they cannot be understood as limitations on the present disclosure. The positional relationships between the constituent elements may be changed as appropriate according to directions for describing the various constituent elements. Therefore, appropriate replacements may be made according to situations without being limited to the wordings described in the specification.

In the specification, unless otherwise specified and defined explicitly, terms "mount", "mutually connect", and "connect" should be understood in a broad sense. For example, a connection may be a fixed connection, or a detachable connection, or an integrated connection. It may be a mechanical connection or an electrical connection. It may be a direct mutual connection, or an indirect connection through middleware, or an internal communication between two elements. Those of ordinary skills in the art may understand specific meanings of these terms in the present disclosure according to specific situations.

In the specification, a transistor refers to an element which at least includes three terminals, i.e., a gate electrode, a drain electrode and a source electrode. The transistor has a channel region between the drain electrode (drain electrode terminal, drain region, or drain) and the source electrode (source electrode terminal, source region, or source), and a current can flow through the drain electrode, the channel region, and the source electrode. It is to be noted that, in the specification, the channel region refers to a region through which the current mainly flows.

In the specification, a first electrode may be a drain electrode, and a second electrode may be a source electrode. Or, the first electrode may be a source electrode, and the second electrode may be a drain electrode. In cases that transistors with opposite polarities are used, a current direction changes during operation of a circuit, or the like, functions of the "source electrode" and the "drain electrode" are sometimes interchangeable. Therefore, the "source electrode" and the "drain electrode" are interchangeable in the specification.

In the specification, "electrical connection" includes a case that constituent elements are connected together through an element with a certain electrical effect. The "element with the certain electrical effect" is not particularly limited as long as electrical signals may be sent and received between the connected constituent elements. Examples of the "element with the certain electrical effect" not only include electrodes and wirings, but also include switch elements such as transistors, resistors, inductors, capacitors, other elements with various functions, etc.

In the specification, "parallel" refers to a state in which an angle formed by two straight lines is above −10° and below 10°, and thus also includes a state in which the angle is above −5° and below 5°. In addition, "perpendicular" refers to a state in which an angle formed by two straight lines is above 80° and below 100°, and thus also includes a state in which the angle is above 85° and below 95°.

In the specification, a "film" and a "layer" are interchangeable. For example, a "conductive layer" may be replaced with a "conductive film" sometimes. Similarly, an "insulation film" may be replaced with an "insulation layer" sometimes.

In the present disclosure, "about" refers to that a boundary is defined not so strictly and numerical values within process and measurement error ranges are allowed.

At present, although the display market is dominated by Liquid Crystal Display (LCD) and Organic Light Emitting Diode (OLED) display, due to the limitations in substrate size, preparation devices, process, etc., it is difficult for LCD and OLED to implement large-size display. In contrast, Micro LED/Mini LED display may implement large-size display by splicing, which can break the size limitation.

An embodiment of the present disclosure provides a detachment device for a spliced display device, wherein the spliced display device includes a first display unit and a second display unit adjacent to the first display unit, wherein the first display unit and the second display unit are spliced with each other; the detachment device for spliced display device includes:

a detachment mechanism disposed to be connected with the first display unit to drive the first display unit to move along a direction away from or close to a plane where the spliced display device is located;

at least one moving device, wherein the moving device includes a moving frame located outside the detachment mechanism and an adjustment member disposed on the moving frame, the moving frame is connected with the second display unit, the adjustment member abut against the detachment mechanism, and on the plane where the spliced display device is located, the moving frame drives the second display unit connected with the first moving device to move along a direction away from the first display unit through the adjustment member.

Figure 5:
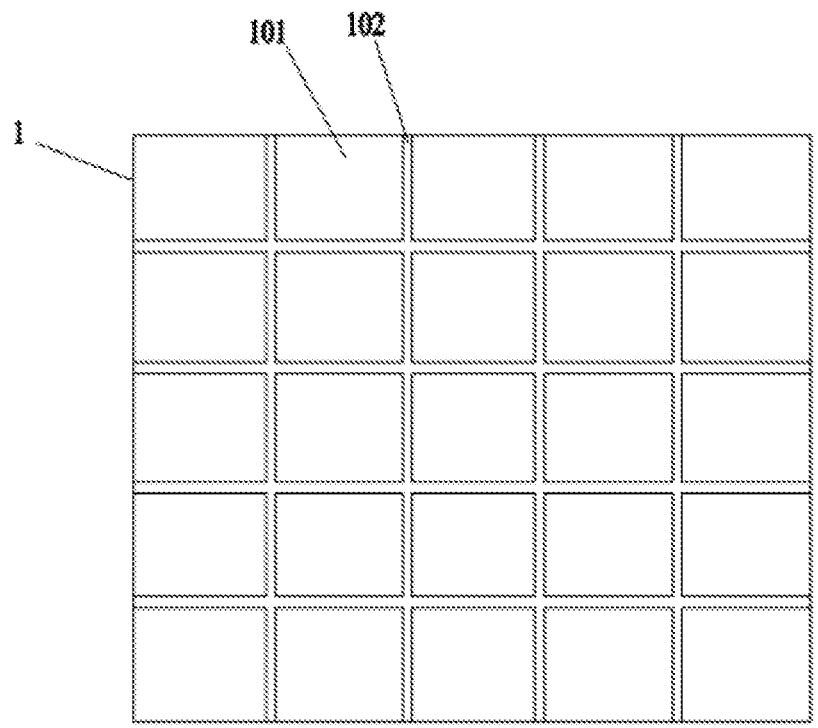
FIG. 5 is a top view of a spliced display device according to an exemplary embodiment of the present disclosure.

FIG. 5 is a top view of a spliced display device according to an exemplary embodiment of the present disclosure. In an exemplary embodiment, as shown in FIG. 5, the spliced display device 1 includes a plurality of display units 101 spliced to each other with splicing gaps 102 disposed between adjacent display units 101. The display unit 101 may employ an LED display unit. The LED display unit may be a Micro LED display unit or a Mini LED display unit. Because LEDs have the advantages such as self-luminescence, wide viewing angle, fast response, simple structure, small volume, lightness and thinness, energy saving, high efficiency, long service life, clear light, etc., a spliced display device can achieve high resolution (such as Pixels Per Inch, PPI).

In an exemplary embodiment, on a plane parallel to the plane where the spliced display device is located, the display unit 101 may take a variety of shapes, for example, the display unit 101 may take a regular or irregular shape, such as a rectangle, a diamond, a trapezoid, a triangle, a polygon, etc. For example the display unit 101 may employ a rectangle, as shown in FIG. 5.

FIG. 1 is a perspective view of a detachment device for a spliced display device according to an exemplary embodiment of the present disclosure. In an exemplary embodiment, as shown in FIG. 1, the embodiment of the present disclosure provides a detachment device for the above-mentioned spliced display device, which includes a detachment mechanism 3 and at least one moving device 2. The detachment mechanism 3 is disposed to be connected with the first display unit, and drives the first display unit to move along a third direction (direction Z) away from or close to the plane where the spliced display device is located, so as to detach the first display unit from its adjacent second display unit. In an example, the third direction (direction Z) is perpendicular to the plane where the spliced display device is located. The moving device 2 includes a moving frame located outside the detachment mechanism 3 and an adjustment member 4 disposed on the moving frame. The moving frame is connected with the second display unit. The adjustment member 4 includes an output end which abuts against the detachment mechanism. On the plane where the spliced display device is located (the plane formed by the direction X and the direction Y), the output end of the adjustment member 4 protrudes and interacts with the detachment mechanism 3. As the detachment mechanism 3 is fixed, the moving frame drives the second display unit connected with the moving frame to move along the direction away from the first display unit through the adjustment member 4, thereby increasing the splicing gap between the second display unit and the first display unit and avoiding the occurrence of bad situations such as too small splicing gap damaging the second display unit during detachment of the first display unit. Wherein, the first display unit refers to a display unit to be detached in the spliced display device, and the second display unit refers to a display unit adjacent to the first display unit in the spliced display device.

Figure 2:
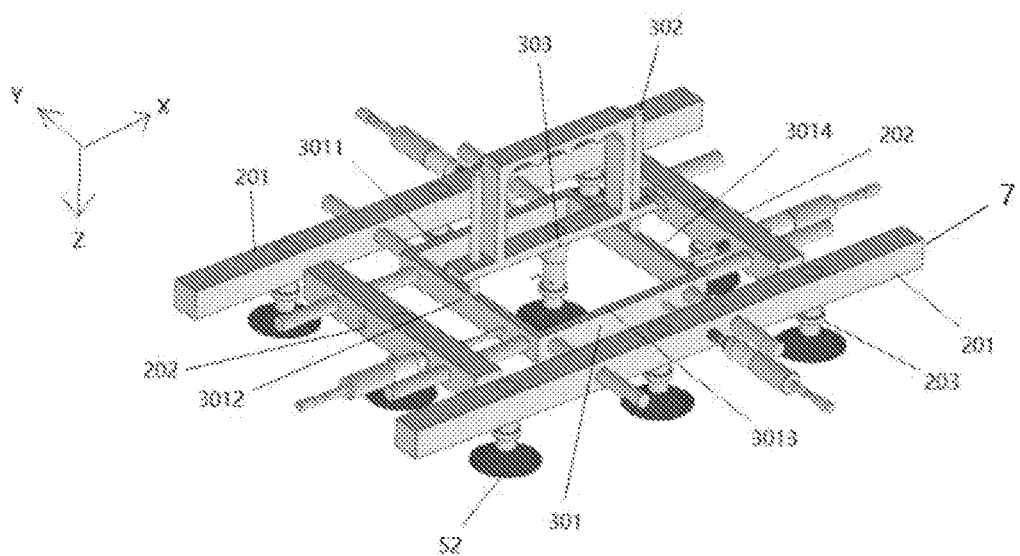
FIG. 2 is a perspective view of a detachment device for a spliced display device absorbing a first display unit according to an exemplary embodiment of the present disclosure.

FIG. 2 is a perspective view of a detachment device for a spliced display device absorbing a first display unit according to an exemplary embodiment of the present disclosure. In an exemplary embodiment, as shown in FIGS. 1 and 2, the detachment mechanism 3 includes a fixing frame 301, a guide post 302 and a detachment member 303.

In an exemplary embodiment, as shown in FIGS. 1 and 2, on a plane parallel to the plane where the spliced display device is located, the fixing frame 301 may be a rectangular frame, and the adjustment member 4 of the moving device 2 abuts against the fixing frame. The fixing frame 301 includes a first frame 3011 and a third frame 3013 disposed oppositely in a second direction (direction Y), and a second frame 3012 and a fourth frame 3014 disposed oppositely in a first direction (direction X), the first frame 3011 and the third frame 3013 extend along the first direction (direction X), the second frame 3012 and the fourth frame 3014 extend along the second direction (direction Y), and the first frame 3011, the second frame 3012, the third frame 3013 and the fourth frame 3014 enclose the rectangular fixing frame 301. The first direction (direction X) intersects the second direction (direction Y), and both the first direction (direction X) and the second direction (direction Y) are parallel to the plane where the spliced display device is located, and, for example, the first direction (direction X) is perpendicular to the second direction (direction Y).

In an exemplary embodiment, as shown in FIGS. 1 and 2, the guide post 302 extends along the third direction (direction Z) that intersects the plane on which the spliced display device is located. The guide post 302 is disposed on the fixing frame 301 and is located on a side of the fixing frame 301 away from the spliced display device. As an example, two guide posts 302 are respectively disposed on the second frame 3012 and the fourth frame 3014 which are disposed opposite each other in the fixing frame 301.

In an exemplary embodiment, as shown in FIG. 1, the detachment member 303 is slidably connected to the guide post 302 and is movable along the guide post 302. The detachment member 303 includes a bearing substrate 3031 a connecting post 3032 disposed on the bearing substrate 3031, and a handle 3033. The bearing substrate 3031 has a plate-like structure, and both ends of the bearing substrate 3031 are provided with connection holes 3034. The bearing substrate 3031 is sleeved on the outside of the guide post 302 through the connection holes 3034, and is slidably connected with the guide post 302. The connecting post 3032 is disposed on a side of the bearing substrate 3031 close to the spliced display device, extends along the third direction (direction Z), and an end of the connecting post 3032 away from the bearing substrate 3031 is provided with a first detachable connecting member 51 capable of being detachably connected with the first display unit. As an example, the first detachable connecting member 51 may be a suction cup. The handle 3033 is disposed on a side of the bearing substrate 3031 away from the connecting post 3032, and the bearing substrate 3031 can be slid along the guide post 302 by pulling the handle 3033.

In an exemplary embodiment, as shown in FIG. 2, the moving device 2 includes at least one moving frame 7, and an adjustment member 4 and support posts 203 disposed on each moving frame 7, the moving frame 7 is located outside the fixing frame 301 of the detachment mechanism and movable along a direction away from the fixing frame 301 by being driven by the adjustment member 4. The output end of the adjustment member 4 abuts against the fixing frame 301 of the detachment mechanism 3. The support post 203 is connected to the second display unit.

In an exemplary embodiment, as shown in FIG. 2, the support post 203 extends along the third direction (direction Z), one end of the support post 203 close to the moving frame 7 is fixedly connected with the moving frame 7, and one end of the support post 203 away from the moving frame 7 is provided with a second detachable connecting member 52 capable of being detachably connected with the second display unit. As an example, the second removable connecting member 52 may be a suction cup.

In an exemplary embodiment, as shown in FIG. 2, the detachment device for spliced display device includes first moving devices 201 located on opposite sides of the fixing frame 301 in the second direction (direction Y) and second moving devices 202 located on opposite sides of the fixing frame 301 in the first direction (direction X). The first moving device 201 and the second moving device 202 are separated from each other and can be moved relative to each other. Specifically, one first moving device 201 is located on a side of the first frame 3011 in the fixing frame 301 away from the detachment member 303, and on first moving device 201 is located on a side of the third frame 3013 in the fixing frame 301 away from the detachment member 303; one second moving device 202 is located on a side of the second frame 3012 in the fixing frame 301 away from the detachment member 303, and one second moving device 202 is located on a side of the fourth frame 3014 in the fixing frame 301 away from the detachment member 303. The two first moving frames 201 and the two second moving frames 202 enclose a rectangular shape, and an active space is disposed between the adjacent first moving frames 201 and the second moving frames 202, which can be relatively moved.

In an exemplary embodiment, as shown in FIG. 2, the support posts 203 of the first moving device 201 and the second moving device 202 are respectively connected to different second display units located on different sides of the first display unit, so that the first moving device 201 and the second moving device 202 can drive the different second display units to move away from the first display unit. As an example, at least one second display unit is disposed along the first direction (direction X) to form a second display unit row, at least one second display unit row is located on opposite sides of the first display unit in the second direction (direction Y); at least one second display unit is disposed along the second direction (direction Y) to form a second display unit column, and at least one second display unit column is located on opposite sides of the first display unit in the first direction (direction X). The first moving devices 201 located on opposite sides of the fixing frame 301 are respectively connected with the two second display unit rows, and the first moving devices 201 drive the second display unit rows connected with the first moving devices 201 to move along the second direction (direction Y), away from the first display unit, so as to increase the splicing gap between the opposite sides of the first display unit and the second display unit in the second direction (direction Y); the second moving devices 202 located on opposite sides of the fixing frame 301 are respectively connected with the two second display unit columns. The second moving devices 202 drive the second display unit columns connected with the second moving devices 202 to move along the first direction (direction X), away from the first display unit, so as to increase the splicing gap between the opposite sides of the first display unit and the second display unit in the first direction (direction X).

In an exemplary embodiment, as shown in FIGS. 1 and 2, the first moving device 201 includes a first moving frame extending along the first direction (direction X) and a first adjustment member 42 disposed on the first moving frame, the first adjustment member 42 extends along the second direction (direction Y), an output end of the first adjustment member 42 abuts against the fixing frame 301, and the first adjustment member 42 is capable of driving the first moving device 201 to move along the second direction (direction Y).

In an exemplary embodiment, as shown in FIGS. 1 and 2, the second moving device 202 includes a second moving frame extending along the second direction (direction Y) and a second adjustment member 41 disposed on the second moving frame, the second adjustment member 41 extends along the first direction (direction X), an output end of the second adjustment member 41 abuts against the fixing frame 301, and the second adjustment member 41 is capable of driving the second moving device 202 to move in the first direction (direction X).

Figure 8:
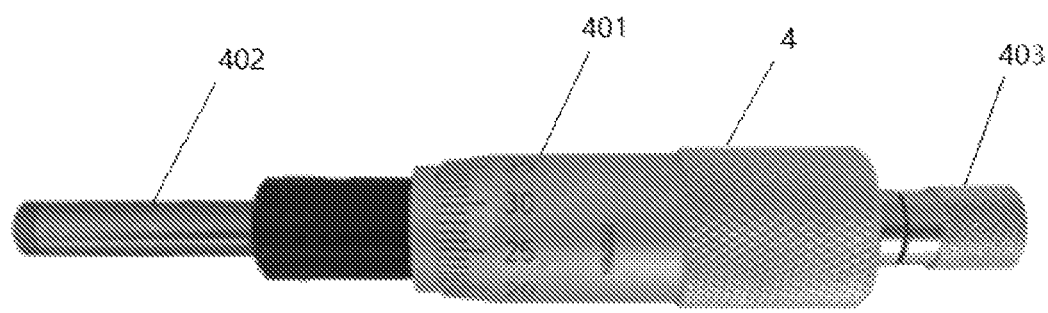
FIG. 8 is a perspective view of an adjustment member of a detachment device for a spliced display device according to an exemplary embodiment of the present disclosure.

FIG. 8 is a perspective view of an adjustment member of a detachment device for a spliced display device according to an exemplary embodiment of the present disclosure. In the exemplary embodiment, as shown in FIG. 8, the adjustment member 4 has a micrometer head structure, so that the adjustment accuracy of the adjustment member 4 can be improved. Specifically, the adjustment member 4 includes a main body 401, an output end 402 disposed at a first end of the main body 401 and an adjustment stud 403 disposed at a second end of the main body 401. The main body 401 of the adjustment member 4 is fixedly connected to the moving frame 7. A first end of the output end 402 is threaded to the main body 401, and a second end of the output end 402 abuts against the fixing bracket. The adjustment stud 403 is rotationally connected with the main body 401, and the adjustment stud 403 is linked with the output end 402. The adjustment stud 403 can be rotated relative to the main body 401 to drive the output end 402 to protrude a distance from one end of the main body 401. By adjusting the rotation of the stud 403, a protruding amount of the output end 402 can be controlled, thereby controlling a moving distance of the moving frame 7 of the moving device 2. A rotation angle of the adjustment stud 403 is proportional to the protrusion amount of the output end 402.

In an exemplary embodiment, as shown in FIG. 1, the moving device 2 further includes a guide rail disposed on the moving frame 7, the guide rail is slidably connected with the moving frame 7, and is fixedly connected with the fixing frame 301, and the moving frame 7 can slide along the guide rail. Specifically, the first moving device 201 further includes a first guide rail 44 extending along the second direction (direction Y), and the first moving frame is capable of sliding along the first guide rail 44. The second moving device 202 further includes a second guide rail 43 extending along the first direction (direction X), and the second moving frame is capable of sliding along the second guide rail 43.

Figure 3:
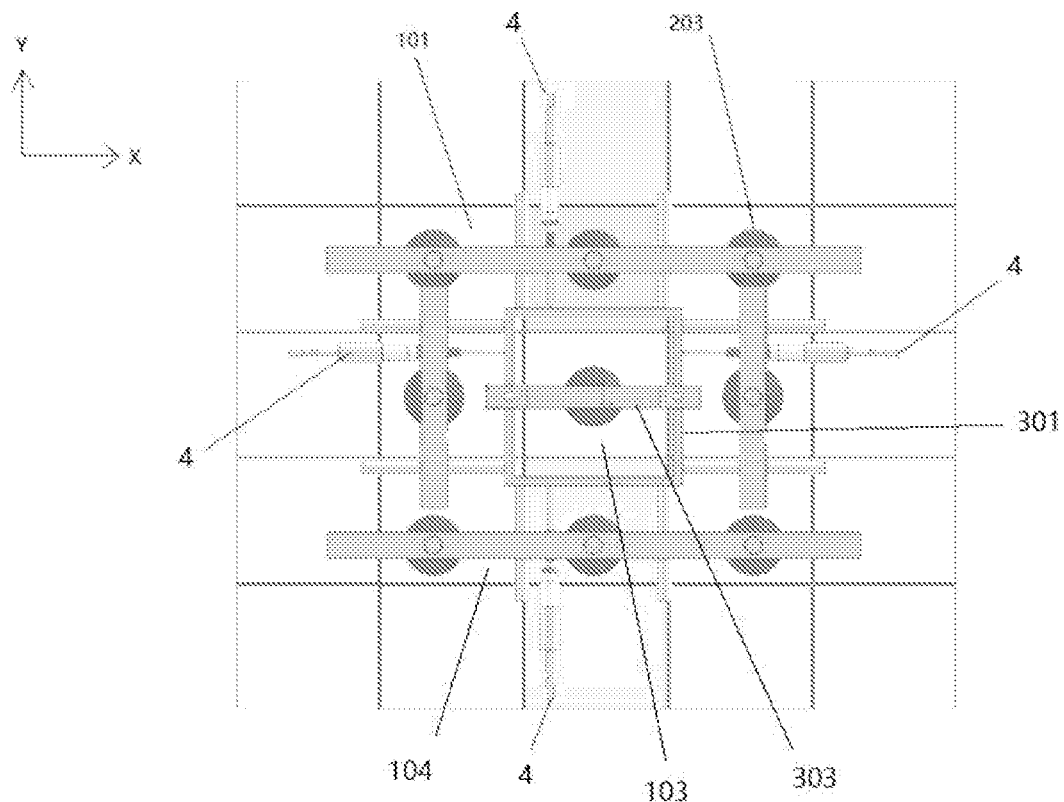
FIG. 3 is a first top view of an adsorbed state of a detachment device for a spliced display device according to an exemplary embodiment of the present disclosure.

A detachment process of a detachment device for a spliced display device according to an embodiment of the present disclosure includes:

first, the detachment mechanism 3 is fixed to the first display unit 103 through the connecting post 3032 of the detachment member 303; subsequently, the moving device 2 is fixed to the second display unit 104 through the support post 203; then, the adjustment member 4 of the moving device 2 drives the moving frame of the moving device 2 to move in a direction away from the fixing frame 301 of the detachment mechanism 3, thereby increasing the splicing gap between the first display unit 103 and the second display unit 104, as shown in FIG. 3.

Figure 4:
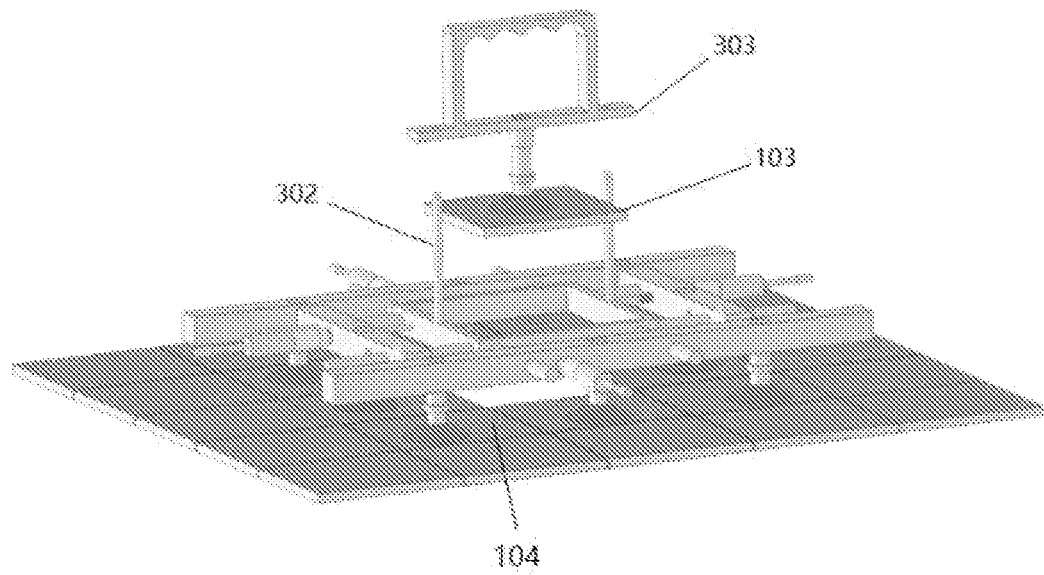
FIG. 4 is a perspective view of a separated state of a detachment device for a spliced display device according to an exemplary embodiment of the present disclosure.

Finally, the detachment member 303 of the detachment mechanism 3 is moved through the guide post 302 along the direction away from the plane where the spliced display device is located, so that the connecting post 3032 of the detachment member 303 drives the first display unit 103 and the second display unit 104 to be separated, as shown in FIG. 4.

The detachment device for a spliced display device according to the embodiment of the present disclosure can adjust the size of the splicing gap between the first display unit and the second display unit through the moving device 2, an adjusted distance of the splicing gap is observable, and the position of the first display unit can be adjusted according to the size of the splicing gap, so as to avoid the occurrence of bad situations such as damage to the second display unit due to too small splicing gap in the process of detaching the first display unit.

Figure 6:
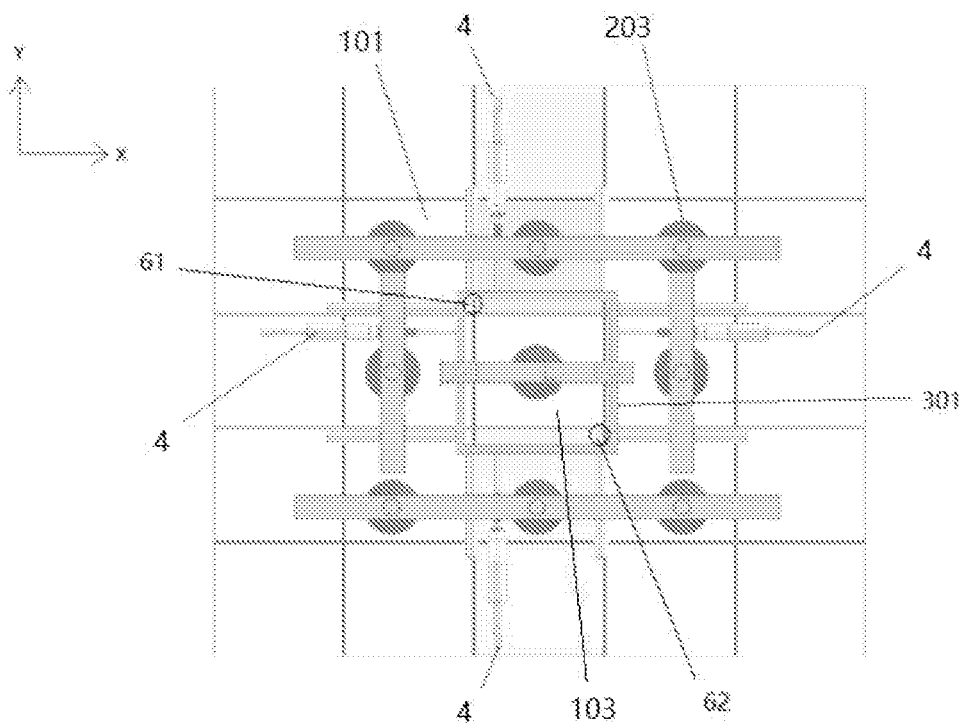
FIG. 6 is a second top view of an adsorbed state of a detachment device for a spliced display device according to an exemplary embodiment of the present disclosure.

FIG. 6 is a second top view of an adsorbed state of a detachment device for a spliced display device according to an exemplary embodiment of the present disclosure. In an exemplary embodiment, as shown in FIG. 6, the detachment mechanism 3 further includes a first alignment device 61 and a second alignment device 62 which are provided on the fixing frame 301 and disposed at intervals, the first alignment device 61 is disposed in alignment with a first corner position of the first display unit 103, and the second alignment device 62 is disposed in alignment with a second corner position of the first display unit 103. As an example, the fixing frame 301 is rectangular, and the first alignment device 61 and the second alignment device 62 are respectively connected to two opposite corner positions of the fixing frame 301, and the first alignment device 61 and the second alignment device 62 are disposed in a axial mirror with respect to the diagonal of the fixing frame 301.

In an exemplary embodiment, both the first alignment device 61 and the second alignment device 62 are alignment lenses.

The detachment device for spliced display devices according to the exemplary embodiment of the present disclosure can be aligned with the corner positions of the first display unit 103 by the first alignment device 61 and the second alignment device 62, and then the position of the moving frame is adjusted by the adjustment member 4. After the adjustment is completed, the detachment device is fixed for a period of time to prevent stress rebound, and then the first display unit 103 is removed.

Figure 7:
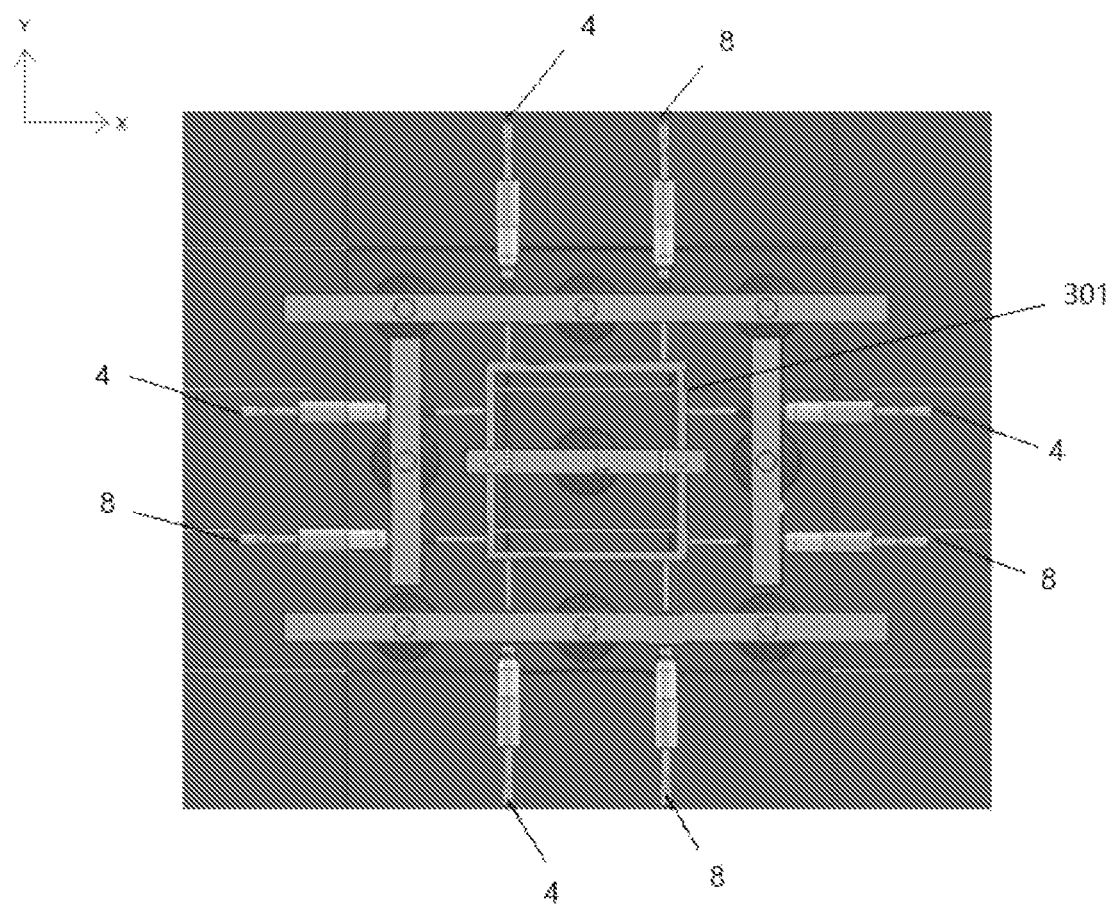
FIG. 7 is a third top view of an adsorbed state of a detachment device for a spliced display device according to an exemplary embodiment of the present disclosure.

FIG. 7 is a third top view of an adsorbed state of a detachment device for a spliced display device according to an exemplary embodiment of the present disclosure. In the exemplary embodiment, as shown in FIG. 7, the moving device further includes fasteners 8 disposed on the moving frame, the fasteners 8 are disposed at intervals with the adjustment members 4, the fasteners 8 are fastened and connected with a first end of the fixing frame 301 of the detachment mechanism, the adjustment member 4 abuts against the second end of the fixing frame 301 of the detachment mechanism, the first end of the fixing frame 301 is fixed by the fasteners 8, and the relative position of the moving frame and the second end of the fixing frame 301 is adjusted by the adjustment member 4, thereby adjusting an angle between the first display unit 103 and the second display unit and ensuring that the angles of each display unit in the spliced display device are consistent.

In an exemplary embodiment, as shown in FIG. 7, the fasteners 8 of the moving device located on opposite sides of the fixing frame 301 are disposed in alignment, and the adjustment members 4 of the moving device located on opposite sides of the fixing frame 301 are disposed in alignment.

In an exemplary embodiment, as shown in FIG. 7, the structure of the fastener 8 may be substantially the same as that of the adjustment member 4, both of which are micrometer head structures.

The present disclosure also provides a detaching method of a detachment device for a spliced display device as described in any one of the embodiments, including:

connecting the detachment mechanism with the first display unit, and connecting the moving frame of the moving device with the second display unit, so that the adjustment member of the moving device abuts against the detachment mechanism;

on the plane where the spliced display device is located, driving, by the moving frame, the second display unit connected with the moving frame to move along a direction away from the first display unit through the adjustment member, so that a splicing gap between the second display unit and the first display unit reaches a predetermined value; wherein, when the splicing gap reaching a predetermined value means that the first display unit will not damage the splicing gap value of the second display unit during the detachment process of the first display unit;

driving, by the detachment mechanism, the first display unit to move along the direction away from the spliced display device, so that the first display unit and the second display unit are detached and separated.

The drawings of the present disclosure only involve structures involved in the present disclosure, and other structures may refer to conventional designs. The embodiments of the present disclosure, i.e., features in the embodiments, may be combined with each other to obtain new embodiments if there is no conflict.

Those of ordinary skills in the art should understand that modifications or equivalent replacements may be made on the technical solutions of the present disclosure without departing from the spirit and scope of the technical solutions of the present disclosure, and shall all fall within the scope of the claims of the present disclosure.

The invention claimed is:

1. A detachment device for a spliced display device, wherein the spliced display device comprises a first display unit and a second display unit adjacent to the first display unit, wherein the first display unit and the second display unit are spliced with each other; the detachment device for spliced display device comprises:
   a detachment mechanism disposed to be connected with the first display unit to drive the first display unit to move along a direction away from or close to a plane where the spliced display device is located; and
   at least one moving device, wherein
      the moving device comprises a moving frame located outside the detachment mechanism and an adjustment member disposed on the moving frame,
      the moving frame is connected with the second display unit,
      the adjustment member abuts against the detachment mechanism, and
      on the plane where the spliced display device is located, the moving frame drives the second display unit connected with the first moving device to move along a direction away from the first display unit through the adjustment member.

2. The detachment device for spliced display device according to claim 1, comprising a first moving device located on opposite sides of the detachment mechanism in a first direction and a second moving device located on opposite sides of the detachment mechanism in a second direction, wherein
   the first moving device and the second moving device are respectively connected with different second display units,
   the first moving device drives the second display unit connected with the first moving device to move along the first direction,
   the second moving device drives the second display unit connected with the second moving device to move along the second direction,
   the first direction intersects the second direction, and
   both the first direction and the second direction are parallel to the plane where the spliced display device is located.

3. The detachment device for spliced display device according to claim 1, wherein the moving device further comprises a support post disposed on the moving frame, and the support post is connected with the second display unit.

4. The detachment device for spliced display device according to claim 1, wherein the moving device further comprises a guide rail disposed on the moving frame, the guide rail is slidably connected with the moving frame and fixedly connected with the detachment mechanism.

5. The detachment device for spliced display device according to claim 1, wherein the moving device further comprises a fastener disposed on the moving frame, the fastener is fastened and connected with a first end of the detachment mechanism, and the adjustment member abuts against a second end of the detachment mechanism.

6. The detachment device for a spliced display device according to claim 1, wherein the adjustment member is of a micrometer head structure.

7. The detachment device for a spliced display device according to claim 1, wherein
   the detachment mechanism comprises a fixing frame, a guide post disposed on the fixing frame, and a detachment member slidably connected with the guide post,
   the adjustment member abuts against the fixing frame,
   the guide post extends along a third direction intersecting with the plane where the spliced display device is located,
   the detachment member is slidably connected with the guide post, and
   the detachment member comprises a connecting post disposed to be connected with the first display unit.

8. The detachment device for spliced display device according to claim 7, wherein the detachment mechanism further comprises a first alignment device and a second alignment device disposed at intervals on the fixing frame, the first alignment device is aligned with a first corner position of the first display unit, and the second alignment device is aligned with a second corner position of the first display unit.

9. The detachment device for spliced display device according to claim 7, wherein the detachment member further comprises a bearing substrate, the bearing substrate is slidably connected with the guide post, and the connecting post is disposed on the bearing substrate.

10. The detachment device for a spliced display device according to claim 9, wherein the detachment member further comprises a handle disposed on a side of the bearing substrate away from the connecting post.

11. A detaching method of a detachment device for a spliced display device according to claim 1, comprising:
    connecting the detachment mechanism with the first display unit, and connecting the moving frame of the moving device with the second display unit, so that the adjustment member of the moving device abuts against the detachment mechanism;
    on the plane where the spliced display device is located, driving, by the moving frame, the second display unit connected with the moving frame to move along a direction away from the first display unit through the adjustment member, so that a splicing gap between the second display unit and the first display unit reaches a predetermined value; and
    driving, by the detachment mechanism, the first display unit to move along the direction away from the spliced display device, so that the first display unit and the second display unit are detached and separated.

12. The detachment device for a spliced display device according to claim 2, wherein the adjustment member is of a micrometer head structure.

13. The detachment device for a spliced display device according to claim 3, wherein the adjustment member is of a micrometer head structure.

14. The detachment device for a spliced display device according to claim 4, wherein the adjustment member is of a micrometer head structure.

15. The detachment device for a spliced display device according to claim 2, wherein
    the detachment mechanism comprises a fixing frame, a guide post disposed on the fixing frame, and a detachment member slidably connected with the guide post,
    the adjustment member abuts against the fixing frame, the guide post extends along a third direction intersecting with the plane where the spliced display device is located, the detachment member is slidably connected with the guide post, and the detachment member comprises a connecting post disposed to be connected with the first display unit.

16. The detachment device for a spliced display device according to claim 3, wherein the detachment mechanism comprises a fixing frame, a guide post disposed on the fixing frame, and a detachment member slidably connected with the guide post, the adjustment member abuts against the fixing frame, the guide post extends along a third direction intersecting with the plane where the spliced display device is located, the detachment member is slidably connected with the guide post, and the detachment member comprises a connecting post disposed to be connected with the first display unit.

17. The detachment device for a spliced display device according to claim 4, wherein the detachment mechanism comprises a fixing frame, a guide post disposed on the fixing frame, and a detachment member slidably connected with the guide post, the adjustment member abuts against the fixing frame, the guide post extends along a third direction intersecting with the plane where the spliced display device is located, the detachment member is slidably connected with the guide post, and the detachment member comprises a connecting post disposed to be connected with the first display unit.

18. A detaching method of a detachment device for a spliced display device according to claim 2, comprising:

connecting the detachment mechanism with the first display unit, and connecting the moving frame of the moving device with the second display unit, so that the adjustment member of the moving device abuts against the detachment mechanism;

on the plane where the spliced display device is located, driving, by the moving frame, the second display unit connected with the moving frame to move along a direction away from the first display unit through the adjustment member, so that a splicing gap between the second display unit and the first display unit reaches a predetermined value; and driving, by the detachment mechanism, the first display unit to move along the direction away from the spliced display device, so that the first display unit and the second display unit are detached and separated.

19. A detaching method of a detachment device for a spliced display device according to claim 3, comprising:

connecting the detachment mechanism with the first display unit, and connecting the moving frame of the moving device with the second display unit, so that the adjustment member of the moving device abuts against the detachment mechanism;

on the plane where the spliced display device is located, driving, by the moving frame, the second display unit connected with the moving frame to move along a direction away from the first display unit through the adjustment member, so that a splicing gap between the second display unit and the first display unit reaches a predetermined value; and driving, by the detachment mechanism, the first display unit to move along the direction away from the spliced display device, so that the first display unit and the second display unit are detached and separated.

20. A detaching method of a detachment device for a spliced display device according to claim 4, comprising:

connecting the detachment mechanism with the first display unit, and connecting the moving frame of the moving device with the second display unit, so that the adjustment member of the moving device abuts against the detachment mechanism;

on the plane where the spliced display device is located, driving, by the moving frame, the second display unit connected with the moving frame to move along a direction away from the first display unit through the adjustment member, so that a splicing gap between the second display unit and the first display unit reaches a predetermined value; and driving, by the detachment mechanism, the first display unit to move along the direction away from the spliced display device, so that the first display unit and the second display unit are detached and separated.

\* \* \* \* \*